UNITED STATES PATENT OFFICE.

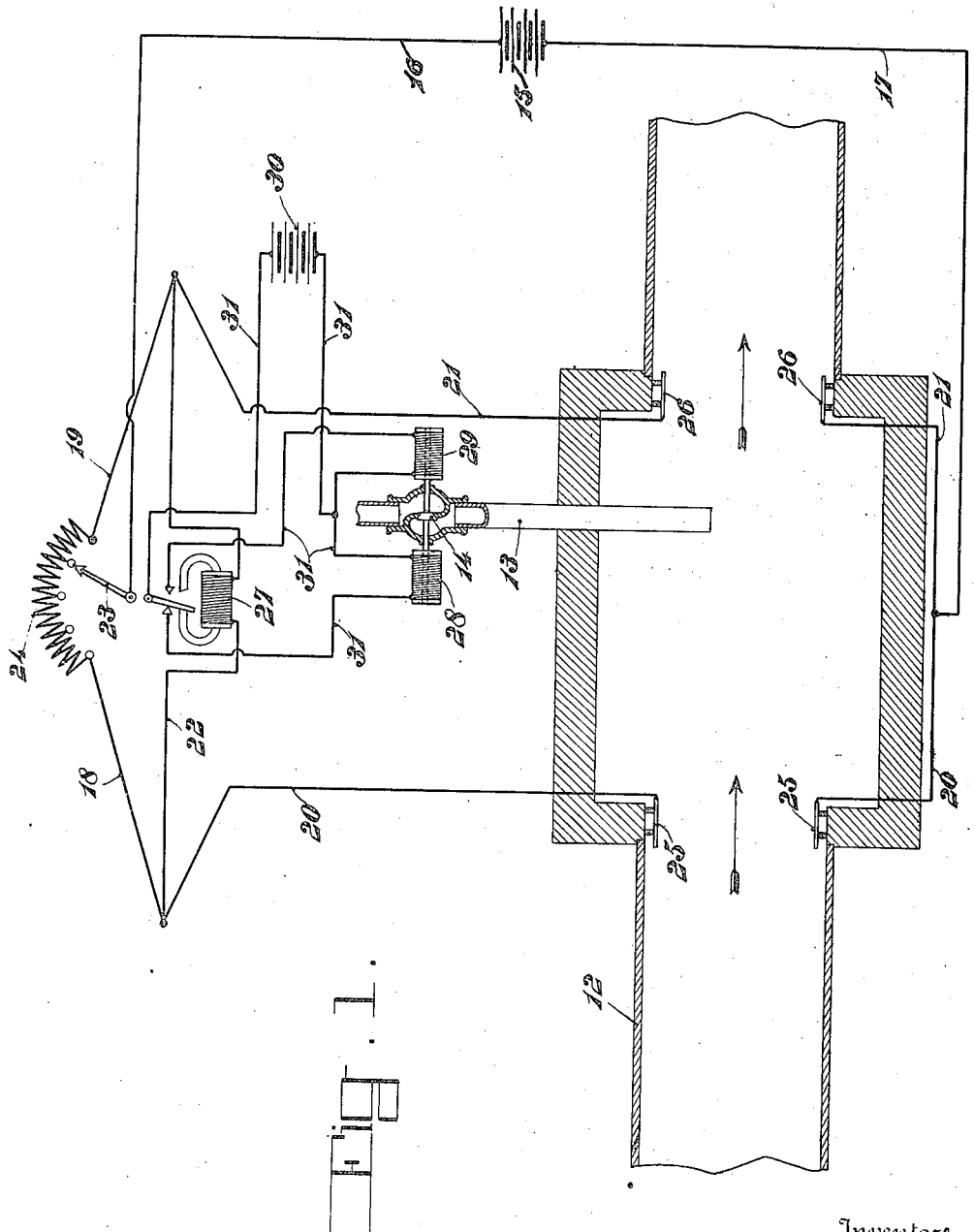

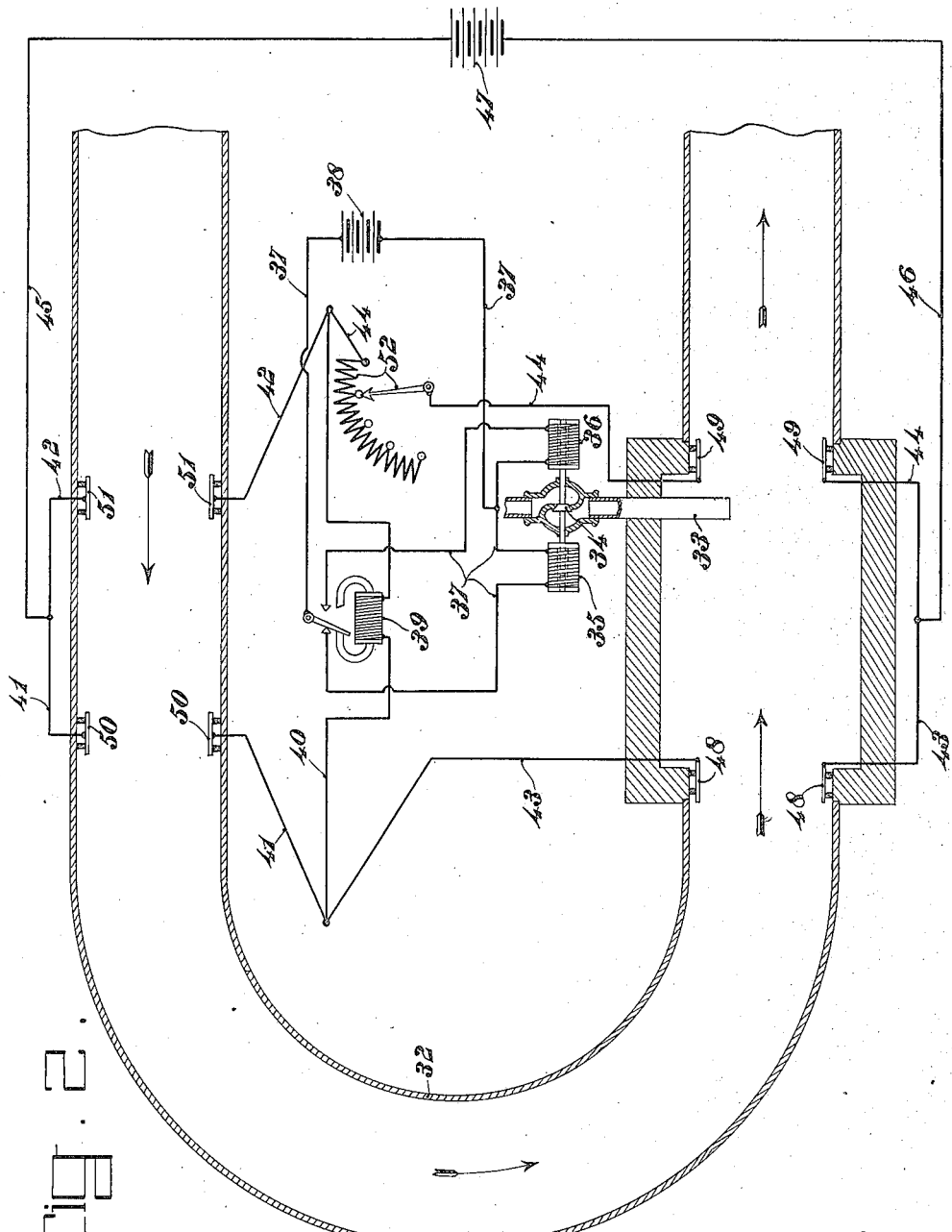

WALTER J. PIKE AND ROY J. SUTTON, OF GRAND RAPIDS, MICHIGAN.

ELECTROCHEMICAL CONTROLLING APPARATUS.

1,145,509.  Specification of Letters Patent.  Patented July 6, 1915.

Application filed May 20, 1915. Serial No. 29,381.

*To all whom it may concern:*

Be it known that we, WALTER J. PIKE and ROY J. SUTTON, both citizens of the United States, residing at Grand Rapids, in the county of Kent and State of Michigan, have invented or discovered certain new and useful Improvements in Electrochemical Controlling Apparatus, of which the following is a specification, reference being had therein to the accompanying drawings.

This invention relates to the treatment of materials of variable requirements or characteristics, such as quantity, composition, etc., in order to obtain a substantially constant product. For example, the invention is applicable to situations in which it is desired to impregnate or treat a stream of fluid with a suitable substance in such a manner as to produce a mixture or solution of constant strength irrespective of the rate of flow of the stream, original chemical constitution of the fluid treated, or other conditions requiring variation from time to time of the amount of treating material added in order to obtain the desired even or constant result.

The particular objects of the invention will best be understood from the following detailed description of certain ways in which the same may be carried into effect by the use of certain forms of apparatus illustrated in the accompanying drawings. It will be understood, however, that the particular purposes, apparatus, operations, etc., hereinafter specified have been chosen for illustrative purposes merely, and that said invention, as defined by the claims hereunto appended, may be otherwise practised without departing from the spirit and scope thereof.

In said drawings: Figure 1 is a diagrammatic view of one form of apparatus suitable for carrying the invention into effect. Fig. 2 is a similar view of a modified arrangement of apparatus.

The invention is based upon the principle that the electric conductivity of substances is dependent upon their chemical or other composition or condition. For example, many fluids or liquids of low conductivity, or, conversely, of high resistance to an electric current, when in an approximately pure state, display an increased conductivity when impregnated or mixed with certain other substances, the degree of conductivity varying with the proportions of the mixture or the strength of the solution.

The invention will be herein shown and described in connection with an apparatus for adding a suitable chemical, such as milk of lime, to water in its flow through a conduit, for the purpose of softening the same, the amount of chemical to be added in order to produce the desired effect depending, of course, upon the rate of flow of the water through said conduit and the matter carried thereby in solution or otherwise prior to the addition of the chemical in question, and also on the strength of such chemical as added.

Referring to Fig. 1, 12 denotes a conduit through which the water flows in the direction of the arrows, and 13 a pipe communicating with the conduit 12 at a suitable point and through which the milk of lime or other chemical in solution or other liquid form is supplied to said conduit. The flow of the impregnating chemical through the pipe 13 to the conduit 12 is controlled by a valve 14 in said pipe. 15 denotes a battery or other source of substantially constant electric energy the circuit from which comprises wires 16 and 17 communicating with a Wheatstone bridge having resistance arms 18, 19, 20 and 21 and a bridge wire 22 connecting the ends of the arms 18 and 20 with the ends of the arms 19 and 21. The wire 17 connects with the ends of the arms 20 and 21, while the wire 16 connects with the adjustable contact member 23 of a rheostat the extreme opposite ends of the resistance coil 24 of which are connected with the arms 18 and 19 respectively. By adjusting the member 23 the relative resistance of the arms 18 and 19 may be varied. 25—25 denote separated electrodes or terminals of like material interposed in the resistance arm 20 and located within the conduit 12 so as to be immersed in the liquid therein, whereby a portion of said liquid is included as a resistance element in said resistance arm. 26—26 denote similar electrodes or terminals interposed in the resistance arm 21 and separated by a space preferably equal to the space separating the electrodes 25—25. The electrodes or terminals 25 are located in the conduit 12 at a point in advance of the supply pipe 13 in the direction of flow, while the electrodes or terminals 26 are located at a point beyond said supply pipe. It will therefore be seen that the liquid included as a resistance element in the resistance arm 20 is liquid untreated by the chemical in the pipe 13, while the liquid included as an element in the resistance arm 21 is liquid which has been treated or impregnated, the distance traveled by the current through the treated and untreated liquid, respectively, being the same. The bridge wire 22 includes a polarized relay 27 or other instrument controllable by the strength and direction of current flowing through said bridge wire. The valve 14 is electrically operated, being provided with opening and closing solenoids or coils 28 and 29, respectively, energized from a battery or other source of electric energy 30 through a circuit comprising wires 31 and controlled by the relay 27. The arrangement is such that current passing through the bridge wire 22 in one direction will cause an operation of the relay 27 to close the circuit from the battery 30 to the opening coil 28 of the valve 14, while current flowing through said bridge wire in the opposite direction will cause an operation of said relay to close the circuit to the closing coil 29 of said valve.

The controller or sliding contact member 23 of the rheostat is so set that the ratio of the resistance in the arm 18 to the resistance in the arm 19 is equal to the ratio of the resistance offered by clear water to the resistance offered by water impregnated to the desired degree. If clear water pass through the conduit 12 it will be seen that the resistance in the arms 20 and 21 will be equal so that, the resistance in the arms 18 and 19 being unequal, current will flow through the bridge wire 22, causing the relay 27 to close the circuit to the opening coil 28 of the valve 14, thereby permitting the chemical to enter the conduit 12 through the pipe 13. Impregnation of the water lowers the resistance in the arm 21, putting the bridge into balanced condition, interrupting the current through the bridge wire 22, and permitting the relay 27 to break the circuit to the coil 28. Should the impregnation of the stream become excessive, so as to decrease the resistance of the treated water to a point below the predetermined ratio above referred to, the bridge will be again unbalanced, causing the current to pass through the bridge wire 22 in the opposite direction and operating the relay 27 to close the circuit to the closing coil 29 of the valve 14, thereby closing said valve and stopping the supply of chemical through the pipe 13.

The Wheatstone bridge is most sensitive when the resistances in all of its resistance arms are equal. In order to take advantage of this fact, as also to neutralize variations in the conductivity of the fluid under treatment caused, for example, by temperature changes or by the presence of substances not effecting the desired result, the apparatus shown in Fig. 2 may be employed. Said apparatus comprises a conduit 32 through which the fluid to be treated flows in the direction of the arrows, a chemical supply pipe 33 controlled by a valve 34 provided with opening and closing solenoids or coils 35 and 36, respectively, energized through wires 37 from a battery or other source of electric energy 38, and controlled by a polarized relay or the like 39 in the bridge wire 40 of a Wheatstone bridge comprising resistance arms 41, 42, 43 and 44 connected by wires 45 and 46 in circuit with a battery or other source of constant electric energy 47. The resistance arm 43 includes a pair of electrodes or terminals 48, while the resistance arm 44 includes a pair of electrodes or terminals 49, said electrodes or terminals 48 and 49 corresponding in position and function to the electrodes 25 and 26, respectively, Fig. 1. The resistance arms 41 and 42 include electrodes or terminals 50 and 51, respectively, also located within the conduit 32, said electrodes or terminals corresponding in all respects to the electrodes or terminals 48, being equally spaced therewith, and being also located in said conduit in advance of the supply pipe 33. In addition to the electrodes or terminals 49 the resistance arm 44 includes a rheostat or variable resistance device 52.

The resistances in the arms 41, 42 and 43 are all equal, being all provided by equal quantities of the clear or untreated water flowing through the conduit 32, this equality being unaffected by the temperature of said water by other variations therein prior to its treatment. The rheostat 52 is so adjusted as to interpose in the arm 44 a resistance equal to the difference between the resistance of untreated water and that of water treated to the desired extent as represented by the spacing of the electrodes. When, therefore, untreated water passes through the conduit 32 the bridge is unbalanced, there being greater resistance in the arm 44 than in any of the other three arms, the resistances of which are equal. Current therefore passes through the bridge wire 40, operating the relay 39 to close the circuit to the coil 35, opening the valve 34, and admitting chemical through the pipe 33 to the conduit 32. Impregnation of the water passing between the terminals 49 reduces the total resistance in the arm 44 so that when said water is impregnated to the desired extent the bridge is balanced. The complete operation of the apparatus shown in Fig. 2 is otherwise substantially the same as that of the apparatus shown in Fig. 1, as above explained.

Having thus described our invention we claim and desire to secure by Letters Patent:—

1. An apparatus for automatically producing a constant mixture of variable ingredients comprising, in combination, a container for one of said ingredients, means for supplying another of said ingredients to said container, an electrically operated valve for controlling said supplying means, a source of electric energy for operating said valve, a second source of substantially constant electric energy, an electric circuit from said last-named source including a portion of the material in said container, whereby the current in said circuit varies proportionately to the conductivity of said material, means in said circuit operated and controlled by said current, and means controlled by said last-named means for controlling the circuit to said valve.

2. An apparatus of the character described comprising, in combination, a conduit through which a fluid to be treated flows, variable means for treating said material at a certain point in its flow through said conduit, a source of substantially constant electric energy, an electric circuit from said source including portions of the material in said conduit at opposite sides of said treating means, whereby portions of the current in said circuit vary proportionately to the conductivity of said material before and after treatment, respectively, and means in said circuit operated and controlled by said current.

3. An apparatus of the character described comprising, in combination, a container for material to be treated, variable treating means for said material, a source of electric energy, an electric circuit from said source including a Wheatstone bridge, one of the resistance arms of said bridge including a portion of the material in said container, and means for interposing an additional variable resistance in said arm.

4. An apparatus of the character described comprising, in combination, a conduit through which a fluid to be treated flows, variable means for treating said fluid at a certain point in its flow through said conduit, a source of electric energy, and an electric circuit from said source including a Wheatstone bridge, one of the resistance arms of said bridge including a portion of the material in said conduit at one side of said treating means, and another of the resistance arms of said bridge including a portion of the material in said conduit at the opposite side of said treating means.

5. An apparatus of the character described, comprising, in combination, a conduit through which a fluid to be treated flows, variable means for treating said fluid at a certain point in its flow through said conduit, a source of electric energy, and an electric circuit from said source including a Wheatstone bridge, three of the resistance arms of said bridge including portions of the material in said conduit in advance of said treating means, and the other resistance arm of said bridge including a portion of the material in said conduit beyond said treating means.

6. An apparatus for automatically producing a constant mixture of variable fluids comprising, in combination, a conduit through which one of said fluids flows, variable means for supplying another of said fluids at a certain point in said conduit, a source of electric energy, an electric circuit from said source including portions of the material in said conduit at opposite sides of said supplying means, whereby portions of the current in said circuit vary proportionately to the conductivity of said first named fluid and the mixture respectively, means in said circuit operated and controlled by said current, and means controlled by said last named means for controlling said supplying means.

7. An apparatus of the character described comprising, in combination, a container for the material to be treated, variable treating means for said material, a source of electric energy, an electric circuit from said source including a Wheatstone bridge, one of the resistance arms of said bridge including a portion of the material in said container, and means automatically controlled from said bridge for controlling said treating means.

8. An apparatus of the character described comprising, in combination, a conduit through which a fluid to be treated flows, variable means for treating said fluid at a certain point in its flow through said conduit, a source of electric energy, an electric circuit from said source including a Wheatstone bridge, one of the resistance arms of said bridge including a portion of the material in said conduit in advance of said treating means, and another of the resistance arms of said bridge including a portion of the material in said conduit beyond said treating means, and means for interposing an additional variable resistance in said last-named arm.

9. An apparatus for automatically producing a constant mixture of variable fluids comprising, in combination, a conduit through which one of said fluids flows, variable means for supplying another of said fluids at a certain point in said conduit, an electrically operated valve for controlling said supplying means, a source of electric energy for operating said valve, a second source of electric energy, an electric circuit from said last-named source including a Wheatstone bridge, three of the resistance arms of said bridge including portions of the material in said conduit in advance of said supplying means, and the other resistance arm of said bridge including a portion of the material in said conduit beyond said supplying means, means for interposing an additional variable resistance in said last named arm, and means automatically controlled from said bridge for controlling the circuit to said valve.

10. The method of treating a material of variable requirements in order to obtain a constant resulting product which consists in passing a current of electricity through said material and varying the treatment of said material in accordance with the conductivity thereof.

11. The method of treating a material of variable requirements in order to obtain a constant resulting product which consists in passing a current of electricity from a source of constant electric energy through said material and utilizing the variations in the flow of said current to effect the automatic treatment of said material in accordance with the requirements.

12. The method of apportioning the flow of one fluid to that of another of variable flow and requirements in order to produce a constant mixture, which consists in immersing in said second fluid a pair of electrodes or terminals of like material, energizing said electrodes or terminals from an outside source of constant electric energy, and apportioning the flow of said first-named fluid in accordance with the electric resistance of said second fluid.

In testimony whereof we affix our signatures, in presence of two witnesses.

WALTER J. PIKE.
ROY J. SUTTON.

Witnesses:
WILLIAM VAN BREE,
HARRY VAN BREE.